(12) United States Patent
Husted

(10) Patent No.: US 8,615,204 B2
(45) Date of Patent: Dec. 24, 2013

(54) ADAPTIVE INTERFERENCE CANCELLATION FOR TRANSMITTER DISTORTION CALIBRATION IN MULTI-ANTENNA TRANSMITTERS

(75) Inventor: Paul J. Husted, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 227 days.

(21) Appl. No.: 13/219,399

(22) Filed: Aug. 26, 2011

(65) Prior Publication Data
US 2013/0052964 A1  Feb. 28, 2013

(51) Int. Cl.
*H04B 1/40* (2006.01)

(52) U.S. Cl.
USPC ............................ 455/88; 455/78; 455/553.1

(58) Field of Classification Search
USPC .................. 455/73, 78, 88, 553.1, 90.1, 90.2
See application file for complete search history.

(56) References Cited

U.S. PATENT DOCUMENTS

| | | | |
|---|---|---|---|
| 6,751,447 B1 | 6/2004 | Jin et al. | |
| 6,801,581 B1 | 10/2004 | Francos et al. | |
| 7,336,129 B2* | 2/2008 | Pan | 330/257 |
| 7,349,503 B2 | 3/2008 | Husted et al. | |
| 7,403,573 B2 | 7/2008 | DeBruyn et al. | |
| 7,463,704 B1 | 12/2008 | Tehrani et al. | |
| 7,742,778 B2 | 6/2010 | Husted et al. | |
| 8,219,056 B2* | 7/2012 | Sundstrom et al. | 455/226.1 |
| 2004/0048576 A1* | 3/2004 | Hildebrand et al. | 455/67.3 |
| 2004/0136470 A1 | 7/2004 | DeBruyn et al. | |
| 2004/0198340 A1* | 10/2004 | Lee et al. | 455/423 |
| 2008/0051042 A1* | 2/2008 | Komaili et al. | 455/114.3 |
| 2008/0182537 A1* | 7/2008 | Manku et al. | 455/226.1 |
| 2008/0268797 A1* | 10/2008 | Ahn et al. | 455/127.1 |
| 2009/0054000 A1 | 2/2009 | Waheed et al. | |
| 2009/0233562 A1* | 9/2009 | Kim et al. | 455/115.1 |
| 2010/0093282 A1* | 4/2010 | Martikkala et al. | 455/63.4 |
| 2010/0120369 A1 | 5/2010 | Ko et al. | |
| 2010/0248736 A1 | 9/2010 | Hulkkonen et al. | |
| 2011/0195670 A1* | 8/2011 | Dakshinamurthy et al. | 455/73 |
| 2013/0113647 A1* | 5/2013 | Sentelle et al. | 342/22 |

FOREIGN PATENT DOCUMENTS

EP  0 998 026 B1  4/2006

OTHER PUBLICATIONS

International Search Report and Written Opinion—PCT/US2011/049910—ISA/EPO—Dec. 22, 2011.

* cited by examiner

*Primary Examiner* — Dominic E Rego

(74) *Attorney, Agent, or Firm* — Mahamedi Paradice Kreisman LLP

(57) ABSTRACT

A wireless communication device includes a core logic, first and second transceiver chains, first and second antennas, and an interference processor. The core logic is coupled to both the first and second transceiver chains, which in turn are coupled to the first and second antennas, respectively. The interference processor is coupled between the first and second transceiver chains. To calibrate circuitry within the first transceiver chain using first signals generated in the first transceiver chain while the second transceiver chain is transmitting second signals via the second antenna, the interference processor connects the transmit circuit of the second transceiver chain to the receive circuitry of the first transceiver chain to form an interference feedback path that can be used to compensate for unwanted components of the second signal undesirably picked up by the first antenna.

20 Claims, 5 Drawing Sheets

ADAPTIVE INTERFERENCE CANCELLATION FOR TRANSMITTER DISTORTION CALIBRATION IN MULTI-ANTENNA TRANSMITTERS

TECHNICAL FIELD

The present embodiments relate generally to communication systems, and specifically to adaptive interference cancellation for calibrating power amplifiers in multi-antenna transmitters.

BACKGROUND OF RELATED ART

Transmitting high power signals using wireless transceivers can be challenging due to the inherent non-linear characteristics of power amplifiers (PAs) provided within the transceivers. Indeed, power amplifiers typically have a limited linear region of operation for which their operating characteristics are predictable. For example, if the operating temperature and/or power level of a power amplifier falls outside a specified range, the power amplifier may begin operating in a non-linear manner that undesirably distorts the data signal being amplified for subsequent transmission by an antenna to a receiving device. The resultant signal distortion can lead to data errors in the receiving device, and can overload and even damage front-end circuitry in the transmitting device. To compensate for the inherent non-linear characteristics of the power amplifier, pre-distortion techniques can be applied to maintain the signal power levels within certain ranges (e.g., by adjusting the gain of the power amplifier).

More specifically, many transceivers include a loopback path that routes the signal output from the power amplifier to a pre-distortion circuit, which in turn processes the loopback signal to calculate a set of values that represents the behavior of the power amplifier (e.g., by comparing the loopback signal with the original signal). These values can be used to calibrate the power amplifier, for example, by pre-conditioning the signal before it is applied to the power amplifier and/or adjusting one or more settings (e.g., the gain setting) of the power amplifier. For many wireless communication devices that employ such calibration techniques, the loopback signal is routed to the pre-distortion circuit via the device's receiver circuitry to avoid an unnecessary duplication of device resources. To achieve proper calibration, the loopback signal should be very accurate (e.g., having an error of less than approximately −40 dBm).

Many multiple-input multiple-output (MIMO) wireless communication devices employ multiple transmit and receive chains and antennas to increase transceiver data rates and/or to achieve signal diversity in communication channels affected by multipath fading. Unfortunately, MIMO transceivers are prone to performance degradations (such as inter-symbol interference caused by multipath dispersion and inter-channel interference or cross-talk) because of limited isolation between the transmit chains when they are concurrently transmitting signals. More specifically, because the isolation between transmit chains in many MIMO wireless devices is approximately 20 dBm, during calibration of a first transceiver chain in a wireless device having two transceiver chains, the second transceiver chain is typically disabled (e.g., precluded from transmitting signals) to prevent signals transmitted by the second transceiver chain from being inadvertently received by the first transceiver chain and interfering with the loopback signal associated with calibrating the first transceiver chain. Indeed, many MIMO wireless devices reduce transmit operations to a single chain (i.e., the calibrating chain) in a round-robin scheme for all transmit chains until the calibration process is complete, thereby effectively reducing the device to single chain transmission, which undesirably degrades transmission data rates.

Thus, for MIMO wireless transceivers, it would be desirable to allow one transceiver chain to be calibrated while the other transceiver chain is concurrently transmitting data.

BRIEF DESCRIPTION OF THE DRAWINGS

The disclosure herein is illustrated by way of example, and not by way of limitation, in the figures of the accompanying drawings and in which like reference numerals refer to similar elements, and in which.

DETAILED DESCRIPTION

Figure 1:
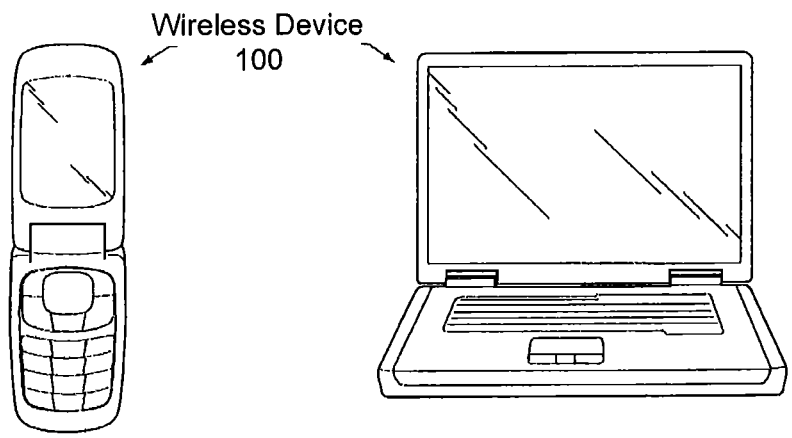
FIG. 1 shows wireless communication devices within which the present embodiments can be implemented.

A method and apparatus for calibrating one transceiver chain in a wireless communication device while another transceiver chain is transmitting wireless signals are disclosed. In the following description, numerous specific details are set forth such as examples of specific components, circuits, software and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of myriad physical or logical mechanisms for communication between components.

An exemplary wireless communication device is disclosed that includes a core logic, first and second transceiver chains, first and second antennas, and an interference processor. The core logic is coupled to both the first and second transceiver chains, which in turn are coupled to the first and second antennas, respectively. The interference processor is coupled between the first and second transceiver chains, and is responsive to an enable signal that can be generated by the core logic or another suitable circuit. To calibrate circuitry within the first transceiver chain using first signals generated in the first transceiver chain while the second transceiver chain is transmitting second signals via the second antenna, the enable signal is asserted to activate the interference processor. In response thereto, the interference processor connects the transmit circuitry of the second transceiver chain to the receive circuitry of the first transceiver chain to form an interference feedback path that can be used to compensate for unwanted components of the second signal undesirably picked up by the first antenna and provided to the receive circuitry within the first transceiver chain.

More specifically, the core logic generates first digital signals that are provided to the first chain for transmission by the first antenna, and concurrently generates second digital signals that are provided to the second chain for transmission by the second antenna. The first signals are converted to analog signals by an associated first digital-to-analog converter (DAC), amplified by an associated first power amplifier, and then selectively transmitted by the first antenna. The output signal of the first power amplifier is attenuated and then provided as a loopback calibration signal to the receive circuitry of the first chain. The second signals are converted to analog signals by an associated second DAC, amplified by an associated second power amplifier, and then transmitted by the second antenna. The signal output from the second power amplifier is provided to and processed by the interference processor to generate a compensation signal that is matched in gain with the loopback calibration signal. Then, the compensation signal is subtracted from the loopback calibration signal to remove, from the loopback calibration signal, unwanted components of signals transmitted by the second antenna and received by the first antenna. In this manner, interference associated with signals transmitted from the second chain and undesirably received by the first chain is eliminated from the loopback calibration signal. Thereafter, the loopback calibration signal can be used to accurately calibrate the power amplifier of the first chain while the second chain is transmitting data in a normal manner. For some embodiments, the calibration signal can be used as a pre-distortion signal that compensates for the non-linear characteristics of the power amplifier, for example, using well-known pre-distortion techniques. For other embodiments, the calibration signal can be used to adjust the power level and/or gain settings of the power amplifier, and/or can be used to adjust various settings of the first DAC.

Thus, in accordance with the present embodiments, the ability to dynamically calibrate the power amplifier in one transceiver chain while another transceiver chain is transmitting data in a normal manner allows calibration operations to be performed without reducing the data throughput of the wireless communication device. In this manner, the power amplifiers of both transceiver chains can be maintained in their linear regions of operation without adversely affecting performance.

FIG. 1 shows wireless communication devices 100 such as a laptop and a cellular phone that can be configured to transmit Wi-Fi signals, Bluetooth signals, cellular signals, and/or other radio frequency (RF) signals concurrently using multiple transceiver chains in accordance with some embodiments. Although not shown for simplicity, the wireless devices 100 can include other devices such as a tablet computer, a desktop computer, PDAs, and so on. For some embodiments, wireless devices 100 can use Wi-Fi signals to exchange data with the Internet, LAN, WLAN, and/or VPN, and can use Bluetooth signals to exchange data with local BT-enabled devices such as headsets, printers, scanners, and so on.

Figure 2:
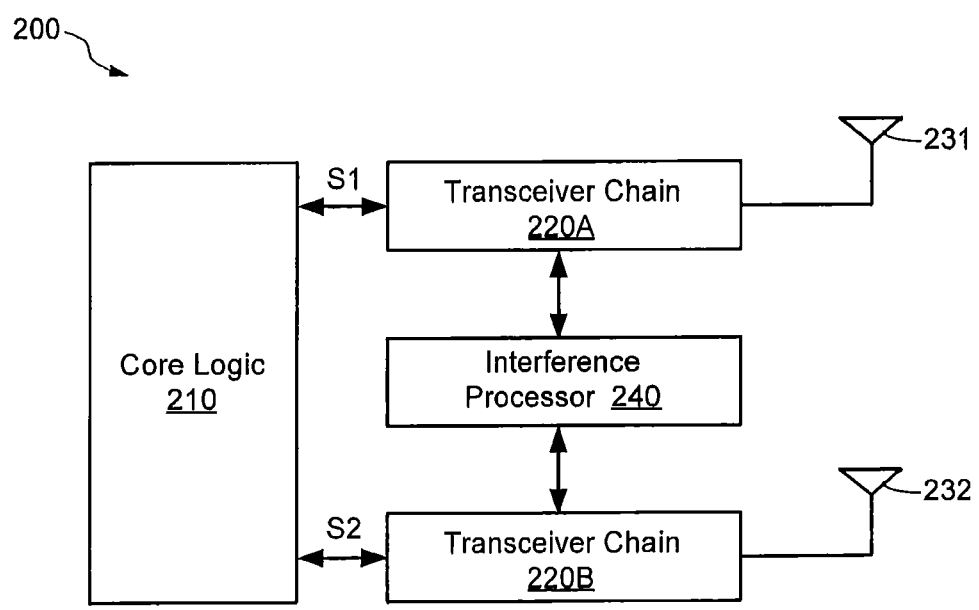
FIG. 2 is a functional block diagram of a 2-chain wireless communication device configured in accordance with the present embodiments.

FIG. 2 is a high-level functional block diagram of a wireless device 200 configured in accordance with some embodiments. Wireless device 200 is shown to include core logic 210, a first transceiver chain 220A, a second transceiver chain 220B, a first antenna 231, a second antenna 232, and an interference processor 240. The core logic 210, which can include well-known elements such as processors and memory elements, performs general data generation and processing functions for the wireless device 200. The first transceiver chain 220A is coupled between core logic 210 and first antenna 231, and is configured to control the transmission and reception of first signals (S1) via first antenna 231. The second transceiver chain 220B is coupled between core logic 210 and second antenna 232, and is configured to control the transmission and reception of second signals (S2) via second antenna 232. The interference processor 240 is coupled between the first and second transceiver chains 220A-220B and, as explained in more detail below, can be used to increase the accuracy of calibration operations of one transceiver chain while the other transceiver chain is transmitting data.

More specifically, first transceiver chain 220A is configured to process and then transmit signals generated by core logic 210 to another wireless device or access point (not shown for simplicity) via first antenna 231, and is also configured to process and then forward signals received from first antenna 231 to core logic 210. Similarly, second transceiver chain 220B is configured to process and then transmit signals generated by core logic 210 to another wireless device or access point (not shown for simplicity) via second antenna 232, and is also configured to process and then forward signals received from second antenna 232 to core logic 210. For the exemplary embodiments described herein, the first and second transceiver chains 220A-220B are configured to operate as half-duplex transceivers, thereby allowing the transmit and receive circuitry within each chain to share a common antenna. For other embodiments, the transmit and receive circuitry (not shown in FIG. 2 for simplicity) within each chain can be connected to its own dedicated antenna to allow for full duplex operation. In addition, although shown as including only two transceiver chains, for other embodiments, wireless communication device 200 can include a greater number of transceiver chains and/or antennas.

Figure 3:
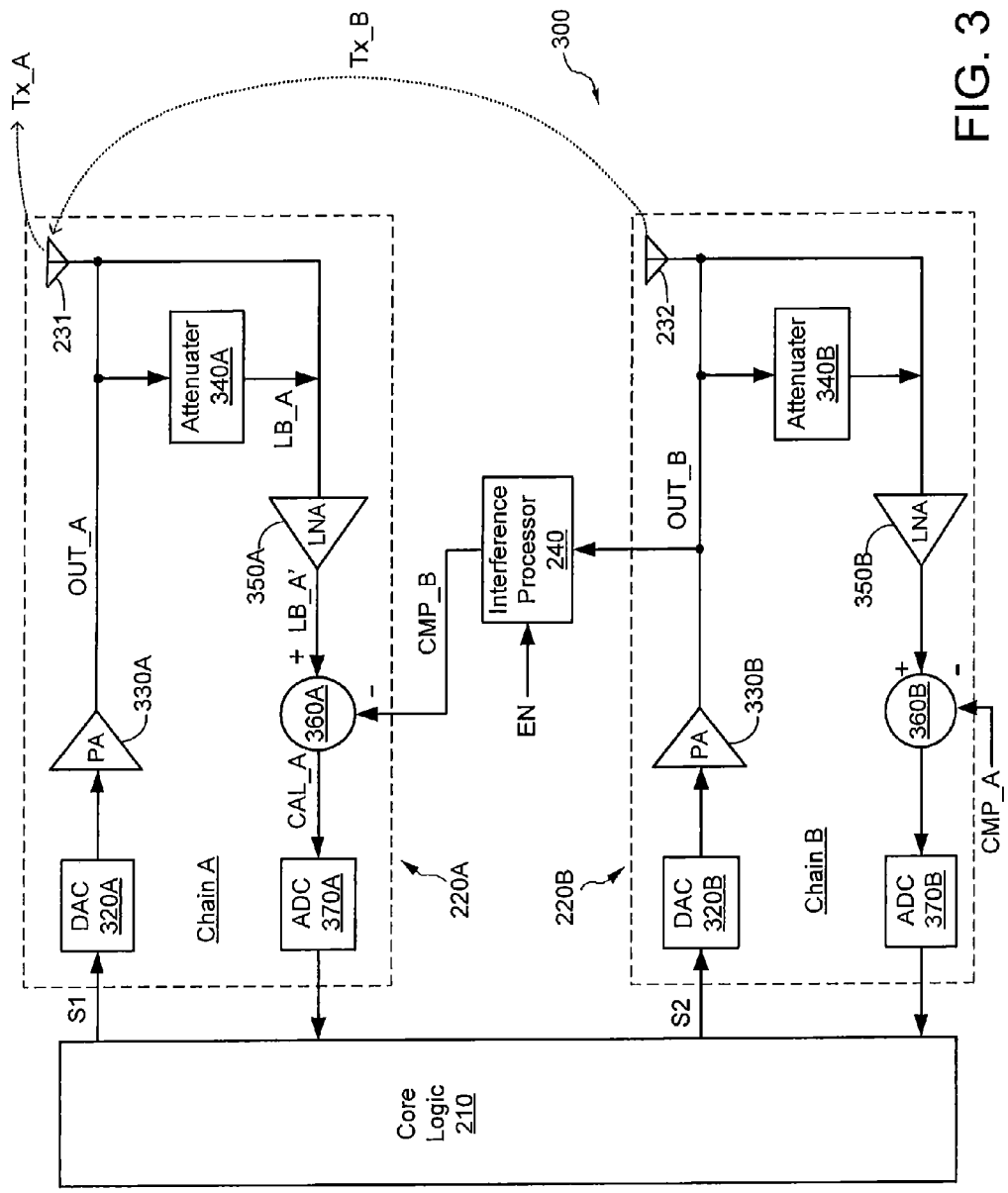
FIG. 3 is a more detailed block diagram of one embodiment of the wireless communication device of FIG. 2.

FIG. 3 is a more detailed block diagram of a wireless device 300 that is one embodiment of wireless device 200 of FIG. 2. Wireless device 300 is shown to include core logic 210, first transceiver chain 220A (also referred to herein as chain A), second transceiver chain 220B (also referred to herein as chain B), antennas 231-232, and interference processor 240. The first transceiver chain 220A, which is coupled between core logic 210 and first antenna 231, is shown to include a digital-to-analog converter (DAC) 320A, a power amplifier (PA) 330A, an attenuation circuit 340A, a low noise amplifier (LNA) 350A, a summing node 360A, and an analog-to-digital converter (ADC) 370A. Note that the DAC 320A and power amplifier 330A form the transmit circuitry for first transceiver chain 220A, and the LNA 350A and ADC 370A form the receive circuitry for first transceiver chain 220A. Further, although not shown in FIG. 3 for simplicity, the transmit circuitry of first chain 220A can include other well-known elements including, for example, mixers, filters, and power control tables, and the receive circuitry of first chain 220A can include other well-known elements including, for example, mixers, filters, and down-samplers.

The second transceiver chain 220B, which is coupled between core logic 210 and second antenna 232, is shown to include DAC 320B, power amplifier (PA) 330B, attenuation circuit 340B, an LNA 350B, a summing node 360B, and an ADC 370B. Note that the DAC 320B and power amplifier 330B form the transmit circuitry for second transceiver chain 220B, and the LNA 350B and ADC 370B form the receive circuitry for second transceiver chain 220B. Further, although not shown in FIG. 3 for simplicity, the transmit circuitry of second chain 220B can include other well-known elements including, for example, mixers, filters, and power control tables, and the receive circuitry of second chain 220B can include other well-known elements including, for example, mixers, filters, and down-samplers.

The interference processor 240 is shown to include a data input coupled to the output of the power amplifier 330B of second chain 220B, a data output coupled to a negative input of summing circuit 360A of first chain 220A, and a control input to receive an enable signal EN. For some embodiments, the enable signal EN is generated by core logic 210. For other embodiments, the enable signal EN can be generated by another suitable circuit, sensor, and/or device. When enabled, the interference processor 240 can be used to compensate for signals transmitted by a second chain and received as interference by a first chain during calibration of the first chain, as explained in more detail below. Interference processer 240 can be implemented using hardware components such as analog circuits or logic gates, and can also include software modules and/or computer programs.

During normal transmit and receive operations, the enable signal EN is de-asserted (e.g., to logic low) to disable the interference processor 240. In response thereto, interference processor 240 does not provide any signals to the first summing circuit 360A, thereby allowing both the first and second chains 220A and 220B to operate in a normal manner. More specifically, during normal transmit operations, the core logic 210 can generate digital data signals for transmission to another wireless device or access point using the first and second transceiver chains 220A and 220B via first and second antennas 231-232, respectively, at the same time. For example, to utilize both transmit chains concurrently, the digital signals generated within core logic 210 can be split into 2 separate signals S1 and S2 using various techniques (e.g., spatial diversity, beam forming, and so on), and then provided to respective chains 220A and 220B. Then, for each chain 220 that receives digital signals from core logic 210, the digital signals are converted to analog signals by DAC 320, and then amplified by power amplifier 330 in a well-known manner for transmission by associated antennas 231 and 232.

Note that when the two chains 220A and 220B concurrently transmit different packets or portions of the same data using their respective antennas 231 and 232, the two signals S1 and S2 can be processed differently to compensate for the spatial difference between the antennas 231 and 232.

During normal receive operations, signals received by first antenna 231 are provided to first chain 220A, and signals received by second antenna 232 are provided to second chain 220B. For each chain that receives signals from its associated antenna, its LNA 350 amplifies the received signals and provides the resultant amplified analog signals to a positive input of summing node 360, which passes the amplified analog signals to ADC 370. In response thereto, ADC 370 converts the analog signals into digital signals for subsequent processing by core logic 210.

Figure 4:
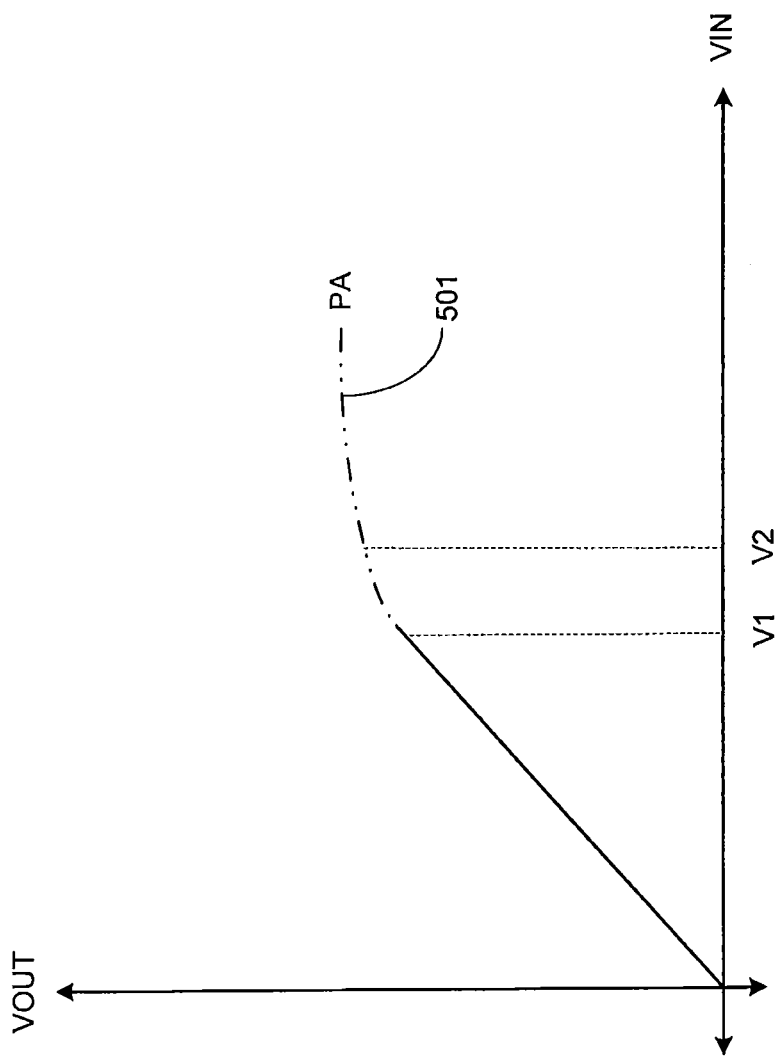
FIG. 4 is a graph depicting the non-linear transfer function of a power amplifier.

Power amplifiers such as power amplifiers 330A and 330B typically exhibit non-linear characteristics in response to input voltage fluctuations. More specifically, because the power amplifiers 330A and 330B each typically exhibit a wide range of power level variations due to their sensitivity to thermal and process variations, power amplifiers 330A and 330B can be dynamically calibrated in accordance with present embodiments to compensate for such undesirable power level variations, as described in more detail below. For example, FIG. 4 is a graph depicting the non-linear transfer function of a power amplifier such as power amplifiers 330A and 330B of FIG. 3. The solid line depicts the linear region of operation for which the relationship between the input voltage (VIN) and the output voltage (VOUT) of the power amplifier (PA) has a constant slope (e.g., is linear), and the dashed line 501 depicts the non-linear region of power amplifier PA. The non-linear region depicted by dashed line 501 results from third-order harmonic terms in the power amplifiers' transfer functions that cause the output voltage to level off as the input voltage increases beyond a certain amount.

Referring again to FIG. 3, for some embodiments, a calibration signal provided by summing circuit 360 can be used as a pre-distortion signal that compensates for the non-linear characteristics of the associated power amplifier 330. For example, if power amplifier 330A is operating in the non-linear region, the non-linear characteristics of its output signal OUT_A can be measured and then used to pre-compensate for the non-linearity by pre-distorting the input signal to power amplifier 330A so that the resulting output signal of power amplifier 330A becomes linear.

An exemplary calibration operation of the first chain 220A performed while the second chain 220B is transmitting output signals Tx_B from antenna 232 is described below. It is to be understood that the present embodiments are equally applicable for calibrating the second chain 220B while the first chain 220A is transmitting output signals Tx_A from antenna 231. To initiate calibration operations of the first chain 220A, the enable signal EN is asserted (e.g., to logic high) to enable the interference processor 240. In response thereto, interference processor 240 becomes operational and connects the output of power amplifier 330B of the second chain 220B to the negative input of summing node 360A of the first chain 220A, and allows the second chain 220B to continue transmitting data as signals Tx_B from second antenna 232 during calibration of the first chain 220A by compensating for any interference signals associated with Tx_B being undesirably received by the first antenna 231.

More specifically, during calibration of the first chain A, the core logic 210 generates first digital signals S1 that are provided to first chain A, and concurrently generates second digital signals S2 that are provided to second chain B for transmission as Tx_B via second antenna 232. The first digital signals S1 are used for calibrating the power amplifier 330A of the first chain 220A, as explained below, and for some embodiments, the first digital signals S1 can be actual data that is transmitted from first chain 220A via first antenna 231 as Tx_A. The first signals S1 are converted to analog signals by DAC 320A and then amplified by power amplifier 330A. The output signal (OUT_A) of power amplifier 330A is attenuated by attenuation circuit 340A and provided as a loopback calibration signal (LB_A) to the input of LNA 350A. The attenuation circuit 340A attenuates the signals amplified by power amplifier 330A to prevent damaging the LNA 350A, which normally receives non-amplified signals provided by first antenna 231. In this manner, attenuation circuit 340A attenuates the signal OUT_A so that it is within the linear range of operation of LNA 350A. The LNA 350A amplifies the loopback calibration signal LB_A in a normal manner, and provides the resultant signal LB_A' to the positive input of summing node 360A.

The second signals S2 are converted to analog signals by DAC 320B, amplified by power amplifier 330B, and then transmitted as Tx_B by second antenna 232. Because the first antenna 231 remains operational during calibration of the first chain 220A, the first antenna 231 can undesirably pick up the transmitted second signal Tx_B as an interference signal that is included in (e.g., superimposed upon) the loopback signal LB_A provided to the input of LNA 350A. Thus, for calibration operations of first chain 220A during which second chain 220B is concurrently transmitting signals Tx_B, the loopback calibration signal LB_A contains components of the signal OUT_A generated by power amplifier 330A and unwanted components of the signal Tx_B transmitted by the second chain 220B.

The output signal (OUT_B) of the power amplifier 330B of the second chain 220B is provided to and processed by the interference processor 240 to generate a compensation signal (CMP_B) that is provided to the negative input of summing circuit 360A and used to compensate for the unwanted reception of signal Tx_B by first antenna 231 of the first chain 220A. More specifically, the interference processor 240 includes circuitry that performs gain matching and/or delays the signal OUT_B so that when the resultant compensation signal CMP_B is subtracted from the loopback calibration signal LB_A' by the summing circuit 360A, the undesirably received signal Tx_B is eliminated. In this manner, the summing circuit 360A generates a calibration signal CAL_A that includes components of the signal OUT_A generated by power amplifier 330A but not unwanted components of the signal Tx_B received by first antenna 231.

For other embodiments, the negative input of summing circuit 360A can be replaced by a positive input, and the interference processor 240 can be configured to phase shift the feedback signal OUT_B by 180 degrees to cancel the unwanted components of signal Tx_B from the receive path of first chain 220A. For still other embodiments, summing circuit 360A can be positioned before the LNA 350A such that the output terminal of summing circuit 360A is connected to the input of LNA 350A and the positive input of summing circuit 360A is connected to the output of attenuation circuit 340A and first antenna 231.

Thereafter, the calibration signal CAL_A can be converted to a digital signal by ADC 370A and then used by core logic 210 to accurately calibrate the power amplifier 330A of the first chain 220A while the second chain 220B is transmitting data in a normal manner. For some embodiments, the calibration signal CAL_A can be used as a pre-distortion signal that compensates for the non-linear characteristics of power amplifier 330A, for example, using well-known pre-distortion techniques. These pre-distortion techniques can be performed in core logic 210, or alternatively can be performed in a dedicated pre-distortion block (not shown for simplicity). For other embodiments, the calibration signal CAL_A can be used to adjust the power level and/or gain settings of power amplifier 330A, and/or can be used to adjust various settings of DAC 320A. For still other embodiments, the calibration signal CAL_A can be used for error vector magnitude (EVM) measurements and/or spectral mask measurements to improve the transmit power control scheme for each of the transceiver chains.

Thus, in accordance with the present embodiments, the ability to dynamically calibrate the power amplifier in one transceiver chain while another transceiver chain is transmitting data in a normal manner allows calibration of the first power amplifier to be performed accurately without reducing the data throughput of the wireless communication device 300. Indeed, the active cancellation of the unwanted components of Tx_B from the loopback calibration signal LB_A maintains an acceptable signal-to-noise ratio (SNR) for the calibration signal LB_A to accurately and dynamically calibrate the power amplifier 330A of the calibrating chain. In this manner, the power amplifiers of both transceiver chains can be maintained in their linear regions of operation without adversely affecting performance.

For some embodiments, the interference processor 240 can be configured to perform interference conditioning that manipulates a complex number H having amplitude and phase, wherein the complex number H characterizes a coupling channel that causes the interference. The manipulation can be used when the channel that couples the interference to the desired signal has a flat response (e.g., no multipath is present). For another embodiment, the interference conditioning can include manipulating multiple complex numbers, one for each sub-bandwidth. This manipulation can be used when the coupling channel is frequency selective (e.g., when there is a flat response within a sub-band, but multipath conditions exists between sub-bands).

For one embodiment, the interference processor 240 can employ active interference cancellation (AIC) circuitry of the type disclosed in commonly-owned and co-pending U.S. patent application Ser. No. 12/769,536 entitled "Active Cancellation of Interference in a Wireless Communication System" filed Apr. 28, 2010, the entirety of which is incorporated by reference herein. For example, using techniques described in the above-referenced patent application, signals transmitted from the second antenna 232 of FIG. 3 are received as interference at the first antenna 231. The AIC circuitry can provide interference conditioning, which manipulates an interference reference of the interference at the transmit front-end of the second chain 220B to approximate an interference observed at the first antenna 231. After tuning of the interference conditioning, the interference can be removed. Using such AIC circuitry to eliminate interference components present in the loopback calibration signal improves the ability to accurately calibrate the first chain 220A using actual data packets (e.g., as opposed to using "dummy" data packets having a known or predetermined signal waveform) while the second chain 220B is also transmitting actual data packets.

Figure 5:
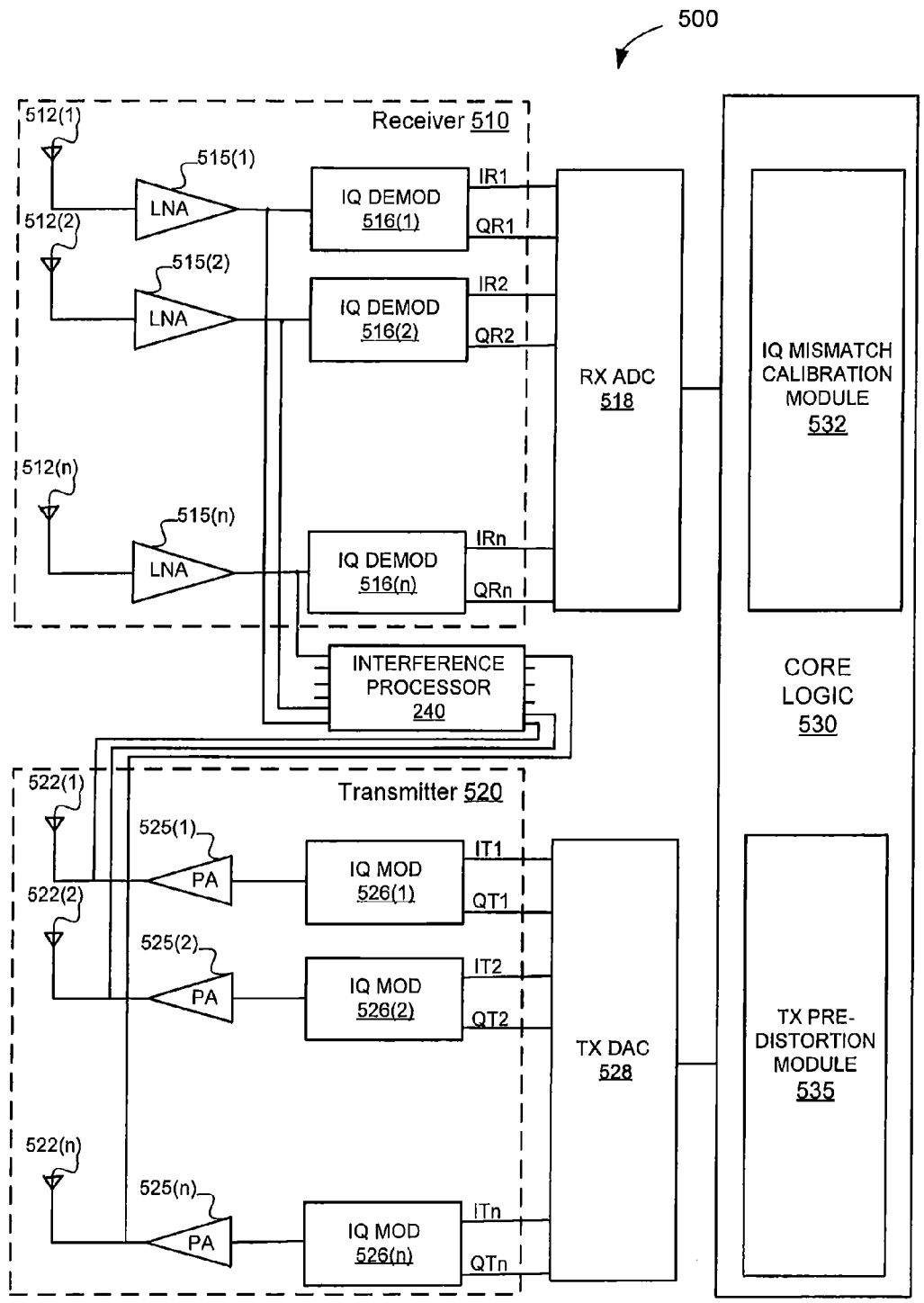
FIG. 5 is a block diagram of a multi-antenna wireless communication device in accordance with some embodiments.

FIG. 5 is a functional block diagram of a multi-antenna wireless communication device 500 that is another embodiment of wireless communication device 100 of FIG. 1. Device 500 is similar to device 300 of FIG. 3, except that device 500 includes a receiver circuit 510 having a plurality (n) of receive chains and a transmitter circuit 520 having a plurality (n) of transmit chains. Each receive chain includes an LNA 515 and an in-phase quadrature (IQ) demodulator 516 coupled between a corresponding one of antennas 512 and core logic 530 via receive ADC 518. For example, a first receive chain includes LNA 515(1) and IQ demodulator 516(1) coupled between receive ADC 518 and a first antennas 512(1). Although not shown in FIG. 5 for simplicity, each receive chain can include other components such as variable gain amplifiers (VGAs), filters, and other front-end reception circuitry. IQ demodulators 516 can demodulate signals with various modulation schemes such as analog or digital modulation (e.g., Gaussian frequency-shift keying (GFSK), phase-shift keying (PSK), quadrature amplitude modulation (QAM), etc.). Receiver ADC 518 receives an analog in-phase (I) signal IR and a quadrature (Q) signal QR of I and Q channels of individual IQ demodulators 516, and converts them to digital signals for processing by core logic 530.

Transmitter 520 is a multi-chain transmitter, wherein each transmit chain includes a power amplifier 525 and an IQ modulator 526 coupled between a corresponding one of antennas 522 and core logic 530 via transmit DAC 528. For example, a first transmit chain includes power amplifier 525(1) and IQ modulator 526(1) coupled between first antenna 522(1) and core logic 530 via transmit DAC 528. A transmitter baseband portion (not shown in FIG. 5 for clarity) provides digital signals for I and Q channels of each transmitter chain to DAC 528, which in turn converts the digital signals to analog I and Q signals. The analog I and Q signals (i.e., IT and QT signals) of each transmit chain are provided from core logic 530 to a respective IQ modulator 526, which in turn mixes the I and Q signals into an RF signal provided to power amplifier 525 of the respective transmitter chain. The power amplifier 525 can be a multistage power amplifier or a single power amplifier preceded by one or more VGAs.

Note that device 500 is depicted in FIG. 5 as having separate receive and transmit antennas 512 and 522 to illustrate the functional operation of device 500. In many actual embodiments, antennas 512 and 522 are the same antenna. For example, in actual embodiments, the first transmit chain and the first receive chain share a first common antenna, the second transmit chain and the second receive chain share a second common antenna, and so on.

As described above with respect to FIG. 4, many power amplifiers exhibit non-linear characteristics (which can be exacerbated by IQ mismatch introduced by IQ modulators 526). These non-linear characteristics can be addressed using pre-distortion calibration operations, for example, as described above with respect to FIG. 3. Pre-distortion calibration operations can be performed using an IQ mismatch calibration module 532 and a pre-distortion module 535. As depicted in the exemplary embodiment of FIG. 5A, IQ mismatch calibration module 532 and pre-distortion module 535 can be contained within core logic 530, which is one embodiment of core logic 210 of FIG. 2.

During calibration operations, interference processor 240 receives input signals from the outputs of power amplifier 525(1)-525(n) and provides corresponding compensation signals to summing circuits (not shown for simplicity) at the inputs of LNAs 515(1)-515(n). More specifically, for each transmit chain that is being calibrated, interference processor 240 receives input signals from the outputs of power amplifier 525 in all other transmit chains and generates a compensation signal that can be used to eliminate unwanted interference from the loopback calibration signal of the transmit chain being calibrated. For example, mismatch calibration module 532 analyzes signals received from receiver ADC 518 to determine values of amplitude and phase errors corresponding to the calibrating transmitter chain, and provides these errors to pre-distortion module 535 for further processing. Pre-distortion module 535 uses the received values of amplitude and phase errors for pre-distortion calibration of the corresponding transmitter chain. For example, pre-distortion module 535 provides a digital pre-distortion control signal to transmitter DAC 528 for digital-to-analog conversion. The converted analog pre-distortion control signal is used by the respective IQ modulator 526 and power amplifier 525 to perform pre-distortion calibration of the respective power amplifier 525.

For some embodiments, interference processor 240 can include multiple AIC circuits of the type disclosed in above-referenced U.S. patent application Ser. No. 12/769,536, thereby allowing for pre-distortion calibration operations to be performed on a selected transmit chain while all other transmit chains are active (i.e., transmitting signals). For another embodiment, a single configurable AIC circuit can be used, which reduces circuit overhead but can calibrate only one transmit chain at a time.

Figure 6:
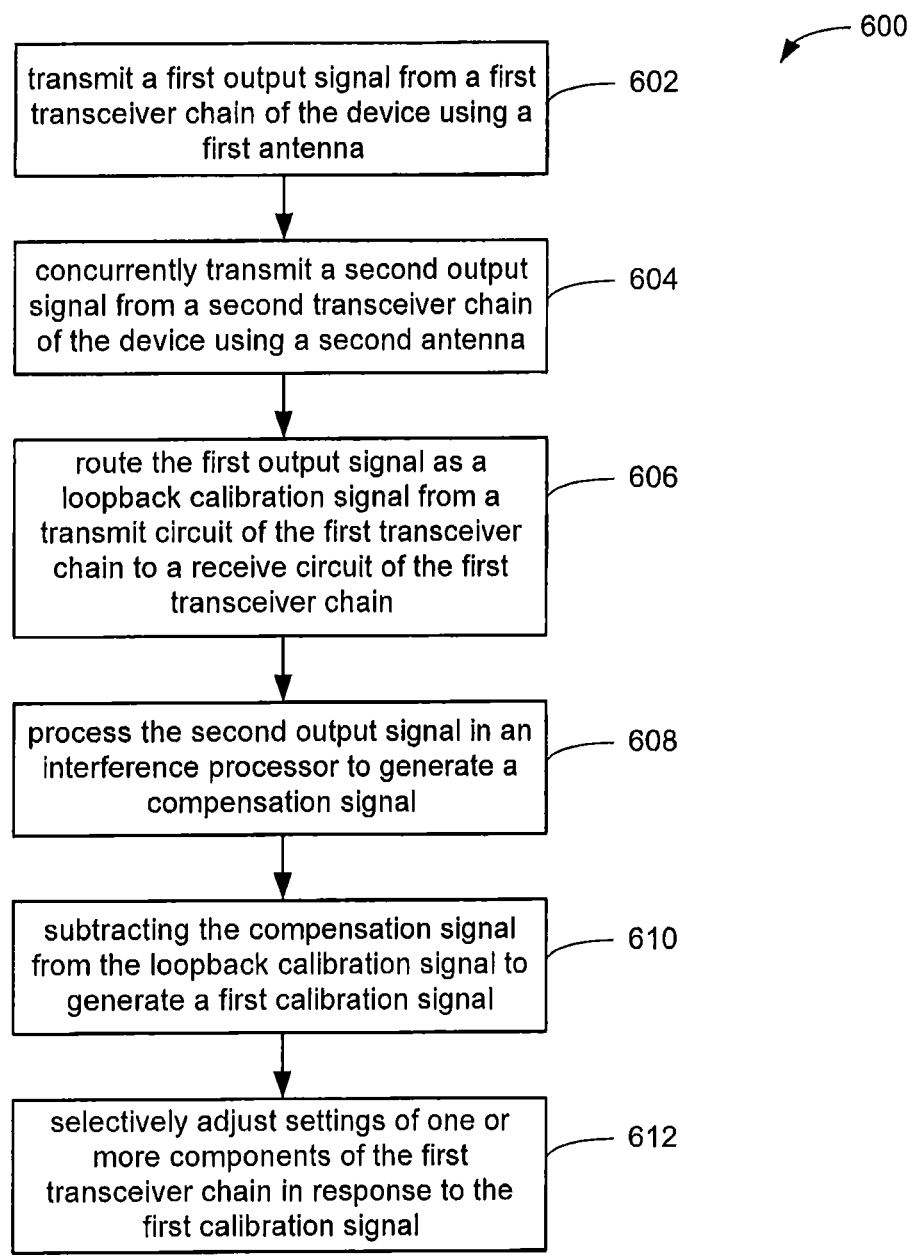
FIG. 6 is a flow diagram depicting an exemplary calibration operation in accordance with some embodiments.

FIG. 6 is an illustrative flow chart depicting an exemplary calibration operation in accordance with some embodiments that allows one transceiver chain of a wireless communication device to be calibrated while another transceiver chain of the device is active. Referring also to FIG. 3, during the calibration operation, a first transceiver chain 220A of the device 300 transmits a first output signal using first antenna 231 (602) while a second transceiver chain 220B of the device 300 concurrently transmits a second output signal using second antenna 232 (604). Then, the first output signal is routed as a loopback calibration signal from the transmit circuit of the first transceiver chain to the receive circuit of the first transceiver chain (606). Concurrently, the interference processor 240 processes the second output signal received from the second transceiver chain to generate a compensation signal (608). As described above, the compensation signal eliminates, from the loopback calibration signal, unwanted components of the second output signal received by the first antenna. Next, the compensation signal is subtracted from the loopback calibration signal to generate a first calibration signal (610). Then, the settings of one or more components of the first transceiver chain are selectively adjusted in response to the first calibration signal (612). As mentioned above, for some embodiments, the first calibration signal can be used as a pre-distortion signal that pre-distorts signals provided by core logic 210 to the first transceiver chain 220A. For other embodiments, the first calibration signal can be used to selectively adjust a gain setting of power amplifier 330A provided within the first transceiver chain 220A, and/or to adjust settings of DAC 320A provided within the first transceiver chain 220A.

While particular embodiments have been shown and described, it will be obvious to those skilled in the art that changes and modifications may be made without departing from this disclosure in its broader aspects, and therefore, the appended claims are to encompass within their scope all such changes and modifications that fall within the true spirit and scope of this disclosure.

What is claimed is:

1. A wireless communication device configured to calibrate one transceiver chain that is transmitting a first output signal while another transceiver chain is concurrently transmitting a second output signal, comprising:
   a first transceiver chain including a first transmit circuit and a first receive circuit coupled in parallel between a core logic and a first antenna, the first transceiver chain further including a loopback path configured to route the first output signal as a loopback calibration signal from the first transmit circuit directly to the first receive circuit;
   a second transceiver chain including a second transmit circuit and a second receive circuit coupled in parallel between the core logic and a second antenna, wherein the second transceiver chain transmits the second output signal via the second antenna while the first transceiver chain transmits the first output signal via the first antenna; and
   an interference processor connected between the second transmit circuit and the first receive circuit, wherein the interference processor is configured to process the second output signal to generate a compensation signal that eliminates, from the loopback calibration signal, unwanted components of the second output signal received by the first antenna.

2. The device of claim 1, wherein the first and second output signals are not dummy packets having predetermined waveforms.

3. The device of claim 1, wherein the interference processor further comprises a control input to receive an enable signal that selectively enables the interference processor.

4. The device of claim 1, wherein the first receive circuit further comprises a summing node that subtracts the compensation signal from the loopback calibration signal to generate a first calibration signal that calibrates the first transceiver chain while the second transceiver chain is transmitting the second output signal.

5. The device of claim 4, wherein the second output signal comprises an output signal of a power amplifier within the second transmit chain.

6. The device of claim 4, wherein the first calibration signal comprises a pre-distortion signal that pre-distorts signals provided by the core logic to the first transceiver chain to pre-compensate for non-linearities of a power amplifier within the first transmit circuit.

7. The device of claim 4, wherein the first calibration signal selectively adjusts a gain setting of a power amplifier within the first transmit circuit to pre-compensate for non-linearities of the power amplifier.

8. The device of claim 4, wherein the loopback path comprises an attenuation circuit that attenuates the first output signal to generate the loopback calibration signal.

9. A method of calibrating one transceiver chain of a wireless communication device while another transceiver chain of the device is active, the method comprising:
   transmitting a first output signal from a first transceiver chain of the device using a first antenna while concurrently transmitting a second output signal from a second transceiver chain of the device using a second antenna;
   routing the first output signal as a loopback calibration signal from a transmit circuit of the first transceiver chain to a receive circuit of the first transceiver chain;
   processing the second output signal in an interference processor to generate a compensation signal;
   subtracting the compensation signal from the loopback calibration signal to generate a first calibration signal; and
   selectively adjusting settings of one or more components of the first transceiver chain in response to the first calibration signal.

10. The method of claim 9, wherein the compensation signal eliminates, from the loopback calibration signal, unwanted components of the second output signal received by the first antenna.

11. The method of claim 10, wherein the unwanted components of the second output signal are superimposed upon the loopback calibration signal in the receive circuit of the first transceiver chain.

12. The method of claim 9, wherein the first and second output signals are not dummy packets having predetermined waveforms.

13. The method of claim 9, wherein the first calibration signal comprises a pre-distortion signal that pre-distorts signals provided by a core logic to the first transceiver chain.

14. The method of claim 9, wherein the first calibration signal selectively adjusts a gain setting of a power amplifier provided within the first transceiver chain.

15. A wireless communication device configured to calibrate one transceiver chain that is transmitting a first signal while another transceiver chain is concurrently transmitting a second signal, comprising:
   means for transmitting a first output signal from a first transceiver chain of the device using a first antenna while concurrently transmitting a second output signal from a second transceiver chain of the device using a second antenna;
   means for routing the first output signal as a loopback calibration signal from a transmit circuit of the first transceiver chain to a receive circuit of the first transceiver chain;
   means for processing the second output signal in an interference processor to generate a compensation signal;
   means for subtracting the compensation signal from the loopback calibration signal to generate a first calibration signal; and
   means for selectively adjusting settings of one or more components of the first transceiver chain in response to the first calibration signal.

16. The device of claim 15, wherein the compensation signal eliminates, from the loopback calibration signal, unwanted components of the second output signal received by the first antenna.

17. The device of claim 16, wherein the unwanted components of the second output signal are superimposed upon the loopback calibration signal in the receive circuit of the first transceiver chain.

18. The device of claim 15, wherein the first and second output signals are not dummy packets having predetermined waveforms.

19. The device of claim 15, wherein the first calibration signal comprises a pre-distortion signal that pre-distorts signals provided by a core logic to the first transceiver chain.

20. The device of claim 15, wherein the first calibration signal selectively adjusts a gain setting of a power amplifier provided within the first transceiver chain.

* * * * *